Feb. 9, 1926.
E. VAN DER PYL
1,572,095
SHOCK ABSORBER
Filed Sept. 10, 1923
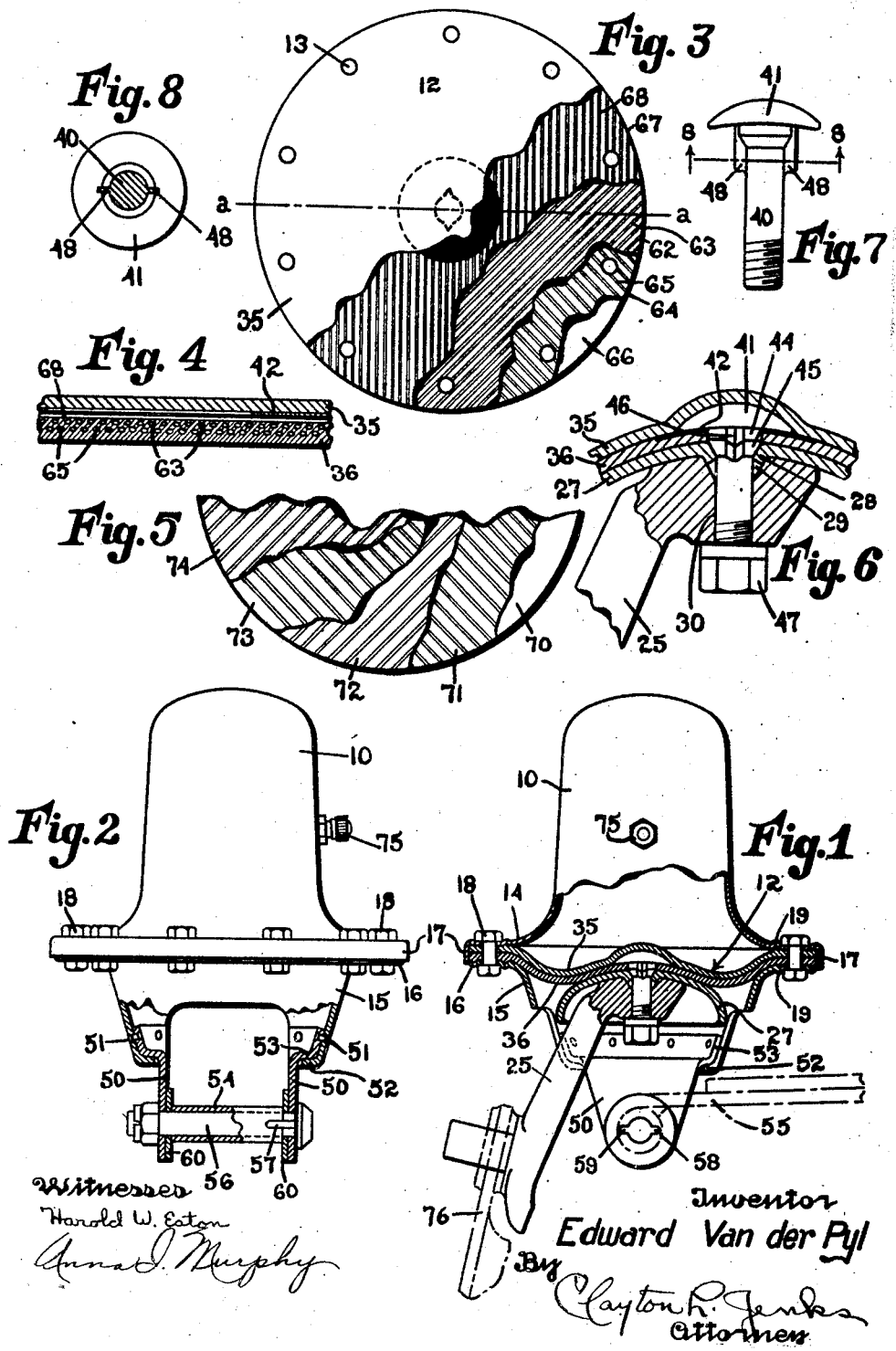
Inventor
Edward Van der Pyl Patented Feb. 9, 1926.

1,572,095

UNITED STATES PATENT OFFICE.

EDWARD VAN DER PYL, OF HOLDEN, MASSACHUSETTS.

SHOCK ABSORBER.

Application filed September 10, 1923. Serial No. 661,731.

*To all whom it may concern:*

Be it known that I, EDWARD VAN DER PYL, a citizen of the United States of America, residing at Holden, in the county of Worcester and State of Massachusetts, have invented certain new and useful Improvements in Shock Absorbers, of which the following is a full, clear, and exact specification.

My invention relates to shock absorbers for vehicles and more particularly to a device of the type described in my Patent No. 1,467,986 dated September 11, 1923.

A shock absorber of the diaphragm type comprises an open-ended casing and an impervious deformable diaphragm secured thereacross. In the form illustrated in my patent, this diaphragm is secured rigidly to one vehicle part and the casing is connected to the other for a rocking motion transversely of the vehicle. Side thrusts are readily absorbed because the rocking motion permits the casing to take such a position that the movement of the diaphragm is substantially normal to its plane of support. There however is a tensional strain on the diaphragm material due to this side sway of the vehicle and the diaphragm is likely to be disrupted thereby.

It is the general object of my invention to provide a shock absorber of the diaphragm type which will be economical to manufacture and will give a long life of service, and particularly to improve the construction of the diaphragm and to so arrange it relative to the casing that the danger of disruption due to tensional strains within the diaphragm material may be minimized.

It is a further specific object to improve the construction of the shock absorber described in my prior patent, and to provide an arrangement of diaphragm, air casing and associated parts which will obviate the difficulties heretofore met.

It is a further object of my invention to provide a means of fastening the diaphragm to its support which will prevent relative movement therebetween and to simplify and render less expensive the method of manufacturing the various parts of the device.

With these and other objects in view as will be apparent in the following disclosure, my invention resides in the combination of parts set forth in the specification and covered by the claims appended hereto.

Referring to the drawings in which like reference numerals indicate like parts:

Fig. 1 is a front elevation, partly broken away, of my shock absorber;

Fig. 2 is a similar view of a side elevation;

Fig. 3 is a top plan view, partly broken away, showing the diaphragm;

Fig. 4 is a fragmentary enlarged vertical section of the diaphragm;

Fig. 5 is a fragmentary horizontal sectional view, partly broken away, of a modified type of diaphragm;

Fig. 6 is an enlarged sectional detail showing the manner of fastening the perch to the diaphragm;

Fig. 7 is a vertical elevation of a modified form of the fastening bolt; and

Fig. 8 is a section on the line 8—8 of Fig. 7.

In accordance with one phase of my invention, I provide a shock absorber of the diaphragm type in which the diaphragm secured across the open end of the casing is so constructed that tensional strains due to any transverse motion of the casing will not disrupt the diaphragm material. To this end I make the diaphragm of a flexible or deformable material, such as rubber, which is reinforced by cords or strands of yarn or the like extending as cords from one portion of the supported circular periphery of the diaphragm to an opposite portion. These strands are encased in rubber and may be made in accordance with well known methods.

Referring particularly to the drawings illustrating my preferred embodiment, I have there shown a shock absorber casing 10 of bell shape, across the open circular mouth of which is secured the diaphragm 12. For convenience in manufacture and assembling, the diaphragm which is disk shaped may have perforations 13 formed therein adjacent its edge, and it is clamped to the lower flared portion 14 of the bell by means of a clamping ring 15 which has an annular portion 16 arranged to fit within a flange 17 depending from the bell which serves to prevent access of water to the diaphragm. The portions 14 and 16 are perforated in localities corresponding with the openings 13 in the diaphragm, and bolts 18 are inserted therethrough and tightened to clamp the diaphragm adjacent its periphery therebetween. If desired, annular grooves 19 may be struck up from the material of the clamping portions in order to afford a further gripping surface upon the diaphragm.

In order to mount the diaphragm on one of the vehicle parts, such as the running gear, I may employ an arrangement similar to that shown in my prior patent which comprises a perch 25 adapted to be rigidly fastened to the running gear. The upper end of this perch is provided with an enlarged rounded surface capable of presenting a large area for supporting the diaphragm. This construction may comprise a dome 27 bolted to the upper end of the perch. This dome, as illustrated in Fig. 1, is so shaped as to present an increasing surface area for contact with the diaphragm as the casing moves downwardly.

It is necessary to fasten the diaphragm fixedly to the perch and dome in such a manner as to prevent the escape of air. To this end and in accordance with my preferred construction I provide the dome 27 with a central aperture bounded by a downwardly extending flange 28 shaped to present a conical surface which is adapted to fit into a conically shaped counterbore 29 in the perch 25, which communicates with the opening 30 formed therein for the passage of a bolt.

The diaphragm illustrated consists of two layers 35 and 36. The upper layer 36 is impervious to air and is preferably made of rubber. The lower layer is provided to give strength to the diaphragm. In order to fasten the diaphragm centrally to its support, I prefer to clamp the diaphragm, dome and perch together by means of a bolt. To prevent the diaphragm from being compressed detrimentally or the parts becoming loosened by usage, I provide a particular construction for this purpose. This bolt 40 has an enlarged head 41 located between the layers 35 and 36 of the diaphragm and is of such size and shape relative to the upper surface of the dome that it will serve to clamp the under layer 36 between the extended portions of the head 41 and the dome 27. A leather disk 42 may be placed between the bolt head and the layer 36 to receive the direct pressure of the bolt head.

In order to prevent the bolt from squeezing the diaphragm material together too much and weaking or injuring the same and to provide a proper wedging clamp to hold the dome in place, I may fashion the bolt, as shown in Fig. 6, with an enlarged cylindrical portion 44 beneath the bolt head, which has a conically shaped portion 45 connecting it with the shank of the bolt. Two wedged shaped ribs 46 are formed on opposite sides of the bolt and are adapted to engage similarly shaped openings in the diaphragm and the dome in order to correctly locate the dome and diaphragm relative to the perch.

It will therefore be seen that by tightening the nut 47 on the lower projecting end of the bolt 40, the flange 28 of the dome 27 is drawn wedgingly into the counterbore 29 in the perch, thereby securing the dome rigidly in place. The cylindrical portion 44 of the bolt is of such length as to leave sufficient thickness of the diaphragm material between the dome and the head 41 of the bolt but at the same time permit the diaphragm layer 36 to be secured tightly between the leather disk 42 and the dome.

A slight modification of the bolt shown in Figs. 7 and 8 comprises making the flanges 48 substantially rectangular in cross section like a key and not in the form of a wedge as illustrated in Fig. 6. In this form the key extends into a similarly shaped slot cut in the perch, and the diaphragm opening.

In order to support the vehicle body from the casing, I provide ring 15 with two downwardly projecting ears 50. As an expediency of manufacture, I form these ears separate from the main body of the ring and secure them thereto by suitable means, such as rivets 51. The conically shaped ring 15 is provided with an inwardly turned flange 52 and the ears 50 are formed with flanged portions 53 bent outwardly to fit against the inner walls of the ring 15 and its flanged portion 52, as illustrated particularly in Fig. 2 of the drawings.

A bushing 54, about which the spring end 55 may be pivotally mounted, is carried on a bolt 56 which passes through and is secured to the ears 50. To prevent the bolt and the bushing turning relative to the ears 50, the bolt is provided with keys 57 which interfit in suitable slots 58 and 59 in the bushing and the ears respectively. Wear pieces 60 may be fixed to the ears as illustrated.

The tensional strains on the diaphragm due to the rocking motion of the casing are in the general direction of the line $a$—$a$ of Fig. 3 and transverse to the direction of travel of the vehicle. In the course of my experimentation, I have found that it is not desirable to employ as a reinforcement for the diaphragm any form of woven fabrics which have strands running at right angles to each other; since these strands, owing to the constant movement within the diaphragm, tend to wear one another out where they cross, and since those strands which run parallel with the line of tension tend to resist movement of the diaphragm and become stretched or otherwise act to prevent the diaphragm giving a long life of service.

I have found that it is advisable to employ reinforcing cords or strands of twisted yarn arranged across the diaphragm from one portion of the periphery to another, and I prefer to use two or more layers of these cords in which the strands in one layer lie at an angle to those in another layer. To avoid subjecting these cords to direct tensional strains I prefer to arrange them at an angle to the direction of tension caused by the relative swinging movement between the casing and the diaphragm.

In the embodiment illustrated, I arrange these strands at an angle to a line running transversely of the running gear, or at an angle to the rocking motion of the casing shown in my patent. Two or more layers of these cords or strands are arranged angularly with respect to each other, and are preferably so placed that none are parallel with the line of motion of the casing and so are not subjected to direct tensional strains; although if desired, a further layer of cords extending in this direction may be employed to supplement the other layers of reinforcing material. If several layers of cords are employed, they are preferably arranged so that the line of rocking motion bisects the angle between the cords of adjacent layers.

Referring to Fig. 3, I have there shown a diaphragm made of several layers. The outer layer 35 may comprise a sheet of elastic rubber. The portion 36 (Fig. 6) which is adapted to give strength to the diaphragm and withstand the shocks and strains caused by movement of the car body relative to the running gear, may be made of a plurality of layers of reinforcing material. This may comprise layer 62 containing parallel strands of rubberized cord 63 running in the direction illustrated. A similar rubberized layer 64 contains cord strands 65 running at right angles to cords 63. A layer 66 of rubber may form the under surface of the diaphragm. If further reinforcements are required I may employ a further layer 67 in which the cords 68 run at right angles to the line $a$—$a$, it being obvious that any tensional strains in this direction $a$—$a$ will not affect the cords but that cords 68 will serve to strengthen the diaphragm.

In accordance with a modification we may form the diaphragm of a multiplicity of layers in which the strands of adjacent layers are at right angles to each other, and this arrangement may be duplicated a necessary number of times to give the desired strength. As shown in Fig. 5 the under layer 70 of rubber has superimposed thereon a layer 71 having cords running in the direction shown. Above this is a layer 72 having cords at right angles to those in layer 71, and above layer 72 are further layers 73 and 74 with their strands parallel with those of layer 71 and 72 respectively. It will be obvious that these layers need not be actually separated from one another but that in the manufacturing operation they may be merged into a single reenforced fabric 36 as shown in Fig. 4.

By forcing air into the casing 10 through a suitable valve 75, such as is employed on automobile tires, a sufficient pressure may be obtained to support the car body and afford desired resiliency to withstand the shocks of the road. The diaphragm which is normally a flat disk may under this pressure assume a distorted shape, as shown in Fig. 1, but it is intended that it return when the pressure is released to a substantially plane disk form. As the diaphragm support moves up and down relative to the casing and as the latter rocks, the strains are absorbed easily by the fabric of the diaphragm, and owing to the arrangement of the reinforcing cords a large degree of flexibility and resiliency is obtained which permits the diaphragm to give under shocks without becoming permanently stretched. Other advantages will be apparent to one who is skilled in this art.

Each pair of bell shaped casings is mounted on the running gear in such a fashion that their center lines, which are normal to the diaphragms, slope downwardly and towards each other. This is accomplished by tilting each perch 25 relative to the supporting part 76 of the running gear and giving the casing a suitable angular position capable of counteracting the tendency for the car body to oscillate laterally.

Having thus described my invention, what I claim as new and desire to secure by means of Letters Patent is:

1. A shock absorber for relatively movable vehicle parts comprising an open-ended casing, a diaphragm secured thereacross, means to connect the casing with one vehicle part, a support for the diaphragm connected with the other vehicle part, and a clamping device to fasten the diaphragm against said support which has a stop adapted to engage the support and prevent the diaphragm from being compressed to a detrimental extent.

2. A shock absorber for relatively movable vehicle parts comprising a hollow casing having an open end, a clamping ring, a diaphragm, means to secure the diaphragm between said ring and casing across said open end, a support for the diaphragm mounted on one vehicle part, ears attached to said ring, and a bushing non-rotatably fastened to said ears, said bushing serving as a pivotal connection between the casing and the other vehicle part.

3. A shock absorber for two relatively movable vehicle parts comprising an open ended casing, a flexible diaphragm disk, fastening means to secure the disk at its periphery across the open end of the casing, and forming therewith an air container, and means to connect the casing and the diaphragm respectively to the two vehicle parts to permit relative movement therebetween, said diaphragm disk having a layer of flexible, air impervious material and non-crossing cords embedded therein which extend as parallel cords across the disk whereby their respective ends are secured by said fastening means.

4. A pneumatic shock absorber comprising an open-ended casing and a flexible diaphragm secured across said open end to form an air container therewith, said diaphragm having layers of substantially parallel reinforcing cords angularly arranged with respect only to those in another layer and material contiguous thereto which is impervious to air.

5. In combination with a vehicle having a running gear and a body, a shock absorber therebetween comprising an open-ended casing and a flexible diaphragm secured across said open end to form an air container therewith, said diaphragm comprising air impervious flexible material and layers of reinforcing cords arranged parallel with one another in each layer and at an angle to a line running transversely of the running gear.

6. A pneumatic shock absorber for relatively movable vehicle parts comprising an open ended casing, a flexible diaphragm secured across said open end to form an air container and means to mount said casing on one vehicle part and the diaphragm on the other vehicle part which permits relative rocking motion between the diaphragm and casing and places a transverse tension in one direction on the diaphragm, said diaphragm being reinforced solely by non-contiguous cords arranged at an angle to said line of tension.

7. A pneumatic shock absorber for relatively movable vehicle parts comprising an open ended casing, a diaphragm secured across the open end of the casing and forming an air chamber therewith, and means connecting said casing and diaphragm with said vehicle parts which permits the casing to rock and subject the diaphragm to tension in one direction, said diaphragm comprising an impervious flexible layer and a reinforcement of layers of non-contiguous cords extending across the diaphragm in different directions relative to each other and at an angle to the direction of tension.

8. A pneumatic shock absorber for relatively movable vehicle parts comprising an open-ended casing and a flexible diaphragm secured across said open end to form an air container therewith, and means to mount said casing on one and diaphragm on the other of the vehicle parts which permits the casing to rock relative to the diaphragm, said diaphragm having a plurality of layers of parallel reinforcing cords, the cords in one layer being non-contiguous to those in another layer and at an angle relative thereto and the sets of cords in each layer running only in one general direction, whereby friction due to one cord rubbing on another is avoided.

9. A pneumatic shock absorber for relatively movable vehicle parts, comprising a casing having a circular opening, a diaphragm, means to secure the diaphragm adjacent its periphery across said opening to form an air impervious container therewith, means to connect the diaphragm and the casing to said vehicle parts, and means permitting air to be pumped under pressure into said casing, said diaphragm comprising air impervious flexible material and angularly arranged reinforcing strands each extending as a cord from one portion of the secured periphery of the diaphragm to an opposite portion.

10. A pneumatic shock absorber for relatively movable vehicle parts, comprising an open end casing, a flexible diaphragm secured across said open end to form an air container therewith, said diaphragm having a centrally disposed locating opening, means to mount the casing for pivotal movement relative to one of the vehicle parts, and means fastened to said diaphragm and having a portion interfitting with said opening to mount the diaphragm on the other vehicle part and locate it relative thereto.

11. A diaphragm for pneumatic devices comprising a thin flexible disk of air impervious material having a plurality of layers of reinforcing cords, the cords in each layer being substantially parallel and extending across the diaphragm, and the sets of cords in each layer lying out of contact with those in adjacent layers and being angularly arranged relative thereto.

12. A diaphragm for pneumatic devices comprising a thin flexible disk of air impervious rubber material having a plurality of layers of reinforcing cords embedded therein, the cords in each layer being arranged parallel and those in one layer lying at an angle less than 90° to those in the adjacent layer.

13. A diaphragm disk for pneumatic devices having spaced openings adjacent its periphery and comprising a flexible, air impervious material having a plurality of non-contiguous layers of reinforcing cords embedded therein, the cords in each layer lying parallel to one another, and those in one layer being arranged at an angle relative to those in an adjacent layer.

Signed at Worcester, Massachusetts, this ninth day of August 1923.

EDWARD VAN DER PYL.